(12) United States Patent
Lee

(10) Patent No.: US 7,057,779 B2
(45) Date of Patent: Jun. 6, 2006

(54) HOLOGRAPHIC STEREOGRAM DEVICE

(75) Inventor: Wai-Hon Lee, Cupertino, CA (US)

(73) Assignee: K Laser Technology, Inc. (TW)

( * ) Notice: Subject to any disclaimer, the term of this patent is extended or adjusted under 35 U.S.C. 154(b) by 0 days.

(21) Appl. No.: 10/443,500

(22) Filed: May 21, 2003

(65) Prior Publication Data

US 2004/0233489 A1    Nov. 25, 2004

(51) Int. Cl.
    *G03H 1/26*    (2006.01)
(52) U.S. Cl. ....................................................... 359/23
(58) Field of Classification Search .................... 359/9, 359/23, 29
    See application file for complete search history.

(56) References Cited

U.S. PATENT DOCUMENTS

| | | | |
|---|---|---|---|
| 3,463,118 A | 8/1969 | Wood | |
| 3,515,459 A | 6/1970 | Wood | |
| 3,567,561 A | 3/1971 | Wood | |
| 4,455,061 A | 6/1984 | Case | |
| 4,510,575 A | 4/1985 | Mueller et al. | |
| 4,568,141 A | 2/1986 | Antes | |
| 4,834,476 A * | 5/1989 | Benton | 359/23 |
| 5,032,003 A | 7/1991 | Antes | |
| 5,058,992 A | 10/1991 | Takahashi | |
| 5,229,872 A | 7/1993 | Mumola | |
| 5,237,433 A | 8/1993 | Haines et al. | |
| 5,291,317 A | 3/1994 | Newswanger | |
| 5,307,184 A | 4/1994 | Nishikawa et al. | |
| 5,428,479 A | 6/1995 | Lee | |
| 5,475,511 A | 12/1995 | Haines et al. | |
| 5,589,955 A * | 12/1996 | Amako et al. | 359/9 |
| 5,754,317 A * | 5/1998 | Nakagawa et al. | 359/9 |
| 5,793,503 A * | 8/1998 | Haines et al. | 359/9 |
| 5,822,092 A | 10/1998 | David | |
| 6,023,356 A | 2/2000 | Kihara et al. | |
| 6,046,856 A | 4/2000 | Takahashi et al. | |
| 6,268,893 B1 | 7/2001 | O'Boyle et al. | |
| 6,508,557 B1 | 1/2003 | Brennesholtz | |
| 2003/0039001 A1 | 2/2003 | King et al. | |
| 2003/0152380 A9 | 8/2003 | Holmes et al. | |
| 2003/0161042 A1 | 8/2003 | Long | |

FOREIGN PATENT DOCUMENTS

JP    2000-259070    *  9/2000

OTHER PUBLICATIONS

Chigrinov "Electro-Optics of FLC with Low Spontaneous Polarization and High Dielectric Anisotrophy in $\pi$-$V_{min}$ Mode," in *Liquid Crystal Devices: Physics and Applications*, Artech-House, Boston-London, pp. 191-192 (1999).
Holzbach "Three-Dimensional Image Processing for Synthetic Stereograms," Master of Science Thesis, submitted to Massachusetts Institute of Technology (1986).
Lee et al. "Optical configuration and color-representation range of a variable-pitch dot matrix holographic printer," Applied Optics 39:40-53 (2000).
Leung et al. "Ebeam computer generated holograms for aspheric testing," SPIE Recent Advances in Holography 215:70-75 (1980).

* cited by examiner

*Primary Examiner*—Mark A. Robinson
*Assistant Examiner*—Alessandro Amari
(74) *Attorney, Agent, or Firm*—Townsend and Townsend and Crew, LLP

(57) ABSTRACT

An improvement to the above described techniques for producing a holographic stereogram. The present invention uses a hologram lens in the process of creating the holographic stereogram, and also uses Fourier transforms of the images for projection onto the recording medium, not the images themselves. A lens between the generated images and the recording medium performs the inverse Fourier transform to convert the image back into a normal image.

11 Claims, 5 Drawing Sheets

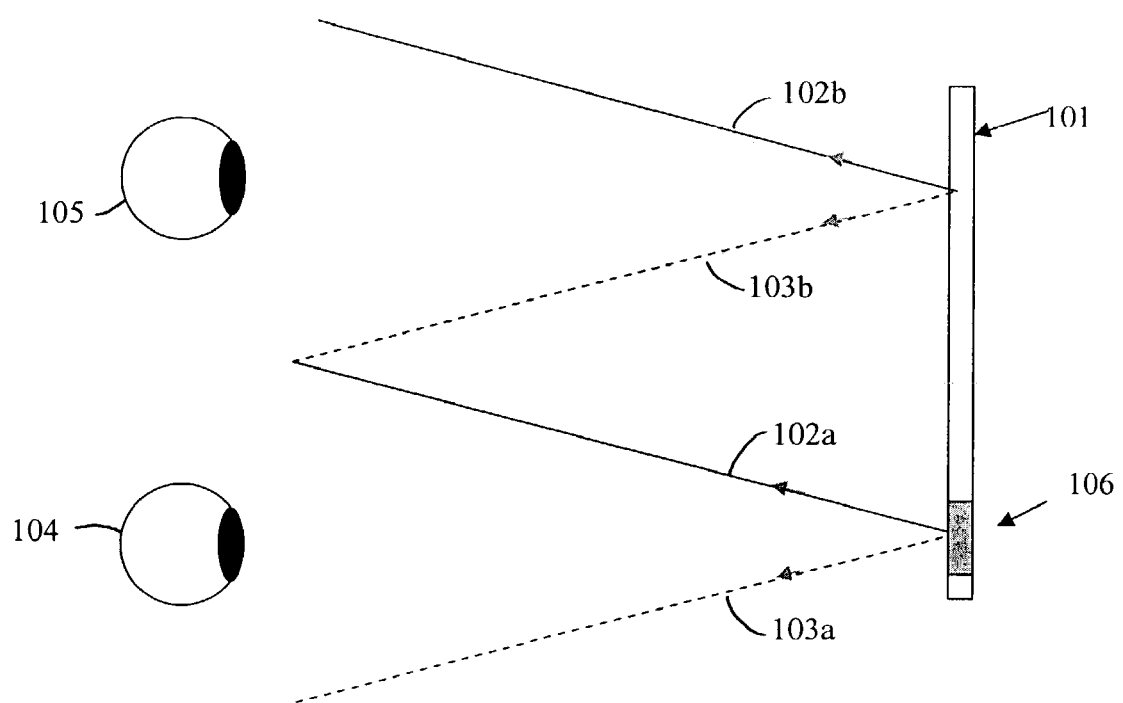
FIG. _1

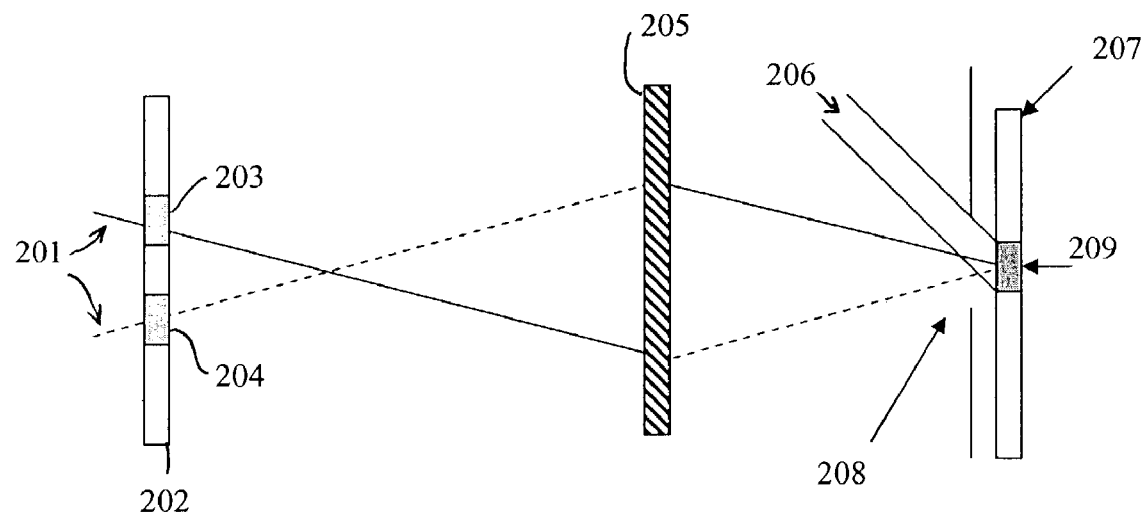
FIG. _2(a)_
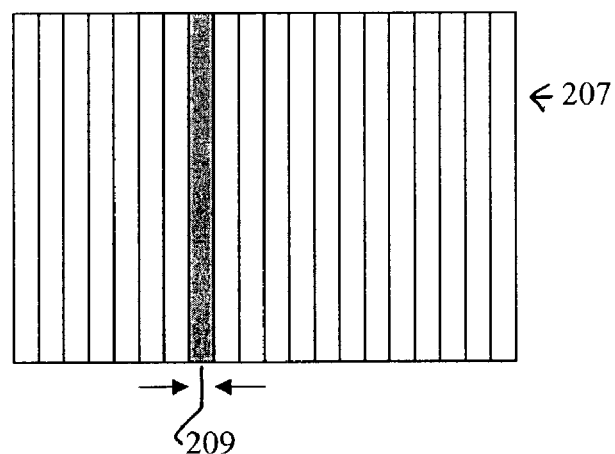
FIG. _2(b)_

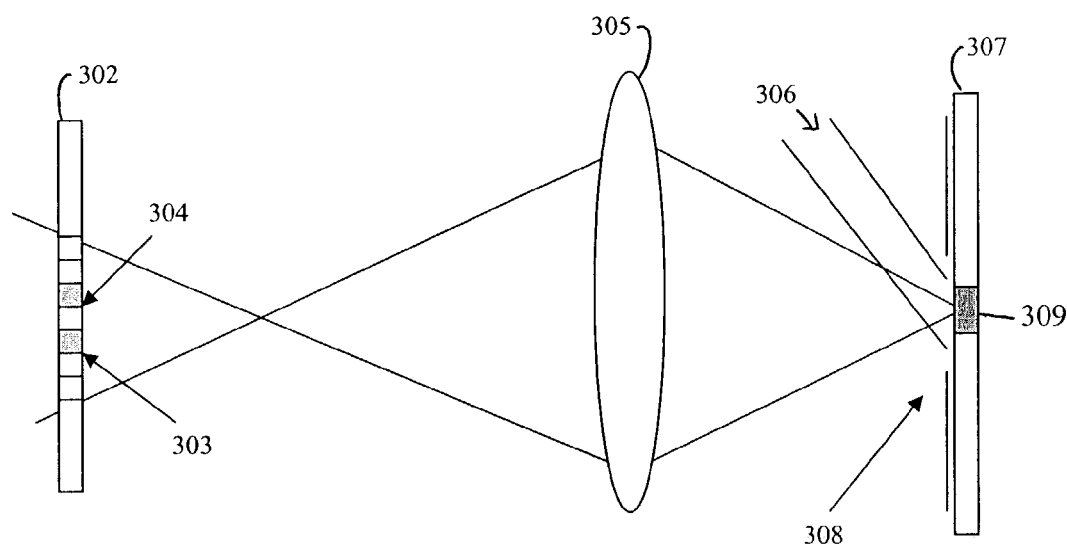
FIG. _3(a)
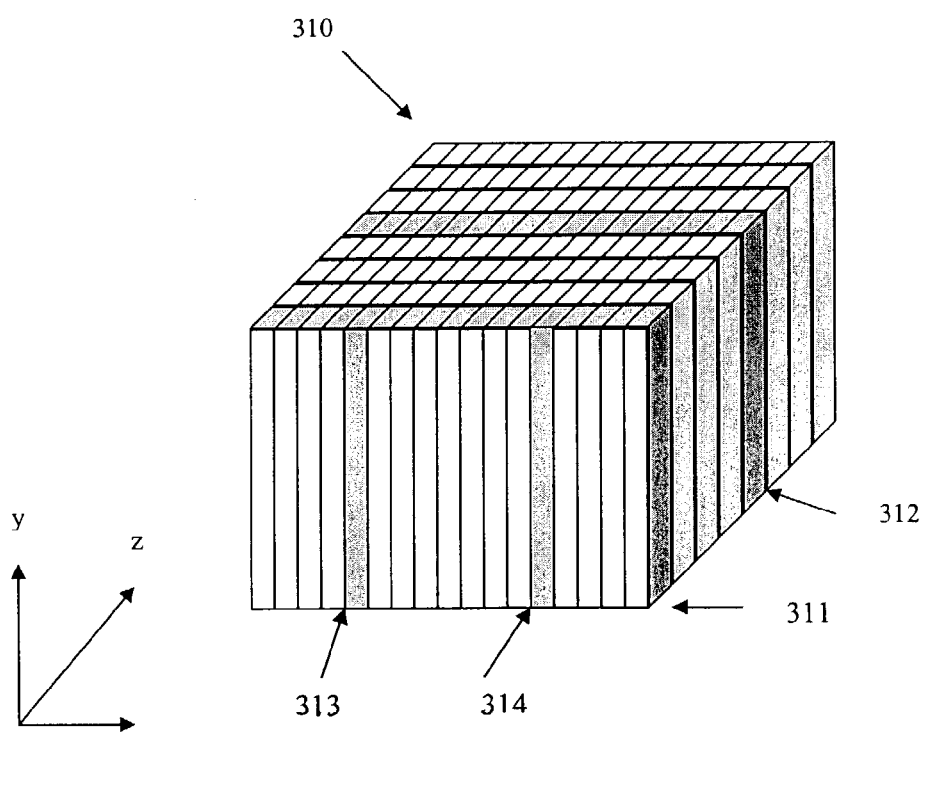
FIG. _3(b)

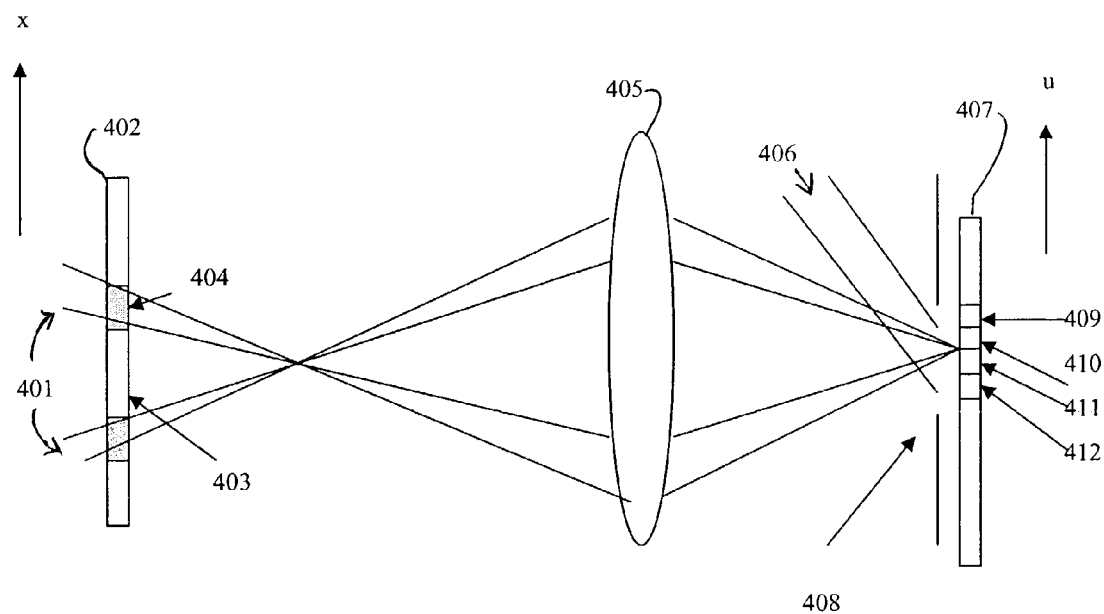
FIG._4

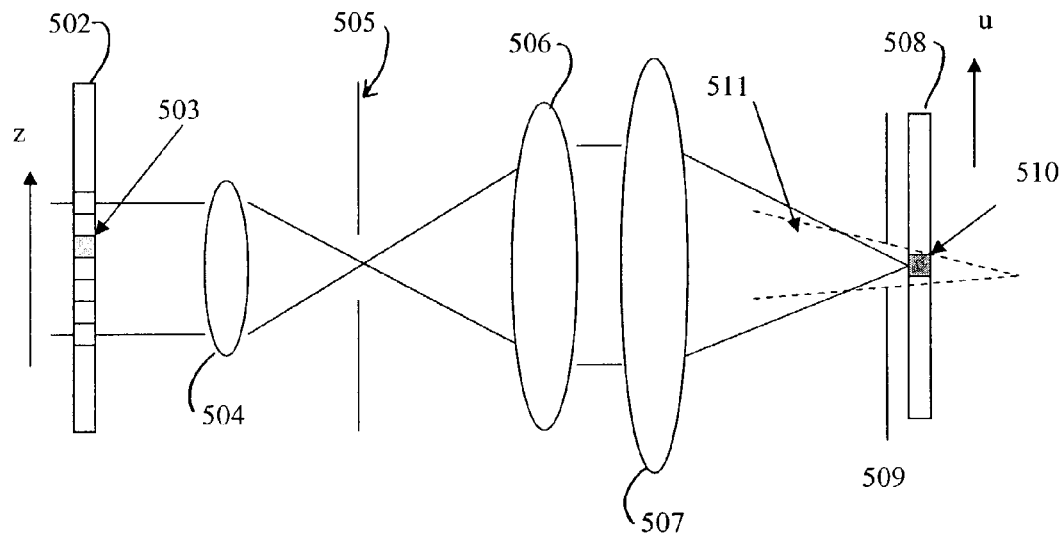
FIG. _5(a)
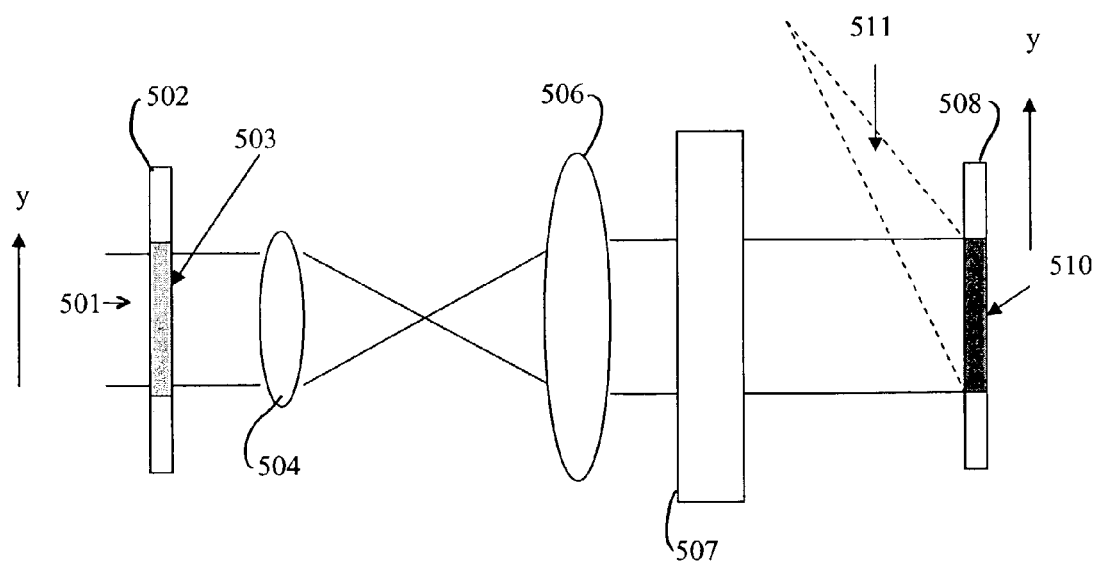
FIG. _5(b)

HOLOGRAPHIC STEREOGRAM DEVICE

CROSS-REFERENCES TO RELATED APPLICATIONS

NOT APPLICABLE

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK.

NOT APPLICABLE

BACKGROUND OF THE INVENTION

The present invention relates to an improved technique for forming a holographic stereo gram.

A hologram is a device that can produce a three dimensional image of an object. In order to produce a hologram, an object is illuminated by a laser in an optical set up. Light reflected off the object is combined with a reference beam on the surface of a photographic plate. The interference pattern between these two light beams is recorded to form the hologram. This process of making a hologram requires an actual object and precise optical arrangement between the object and the reference beam to produce the interference fringes. However, the human brain can combine views perceived by the right and left eyes to produce a perception of a three dimensional object. The two dimensional views can be photographs of an object or views of an object created by a computer.

A stereogram is a pair of pictures presenting two different views of an object. The three dimensional image produced by a stereogram typically has only horizontal parallax. There are many methods of presenting views of an object to the right and left eyes separately. The most common one is using a stereo viewer, which simply restricts the right eye to see one view and the left eye to see the other view of an object. Stereograms can also be printed in red and green color. By means of using color filter in front of the right and left eye, each eye will see different views of the object. Examples of stereograms can be found in U.S. Pat. Nos. 6,037,971 and 5,795,154.

One type of stereogram is called a lenticular stereogram. This is one of a number of methods for viewing stereo grams without the use of a viewing aid. The lenticular stereogram technique interlaces narrow strips of the two views and placed them behind a set of prisms so that alternate segments of the two views are separately projected to the right and left eyes.

A holographic stereogram is another method whereby two images are encoded with different spatial frequency so that when the hologram is illuminated by light, the two images will emerge from the hologram at different angles. The diffraction angle is determined by the separation of the eyes and the viewing distance. For a typical eye separation of 50 mm and a viewing distance of 400 mm, the angle is about 7.5 degrees.

FIG. 1 shows light beam 102 as bounded by ray 102$a$ and ray 102$b$ and beam 103 as bounded by ray 103$a$ and ray 103$b$ diffracted from the holographic stereogram 101 toward the right eye 104 and left eye 105. Ray 102$a$ and ray 103$a$ are emitted from hologram element 106 in the holographic stereogram 101. This suggests a technique for constructing such a holographic stereogram with only horizontal parallax by constructing the stereogram by having two beams such as 102$a$ and 103$a$ interfering within a narrow slit and composing the stereograms one narrow segment at a time. See Mark Holzbach, "Three dimensional image processing for synthetic holographic stereograms", M.S. thesis. Massachusetts Institute of Technology, September 1986, pp. 1 86; C. K. Lee et al., "Optical configuration and color-representation of a variable-pitch dot matrix holographic printer" Appl. Opt., Vol. 39, No. 1, p. 40 (2000); U.S. Pat. Nos. 5,237,433, 5,475,511 and 5,793,503.

FIG. 2($a$) shows how the hologram of FIG. 1 is formed. A converging cone of laser light 201 illuminates a transparency 202 (which could be an LCD display). An image of the transparency is projected on a rotating diffuser 205, which produces uniform illumination at the recording plane 207. To record a stereogram the image segment 204 corresponds to the image for the left eye and the image segment 203 corresponds to the image for the right eye. The diffused light from these two image segments propagates to the recording plane 207. A reference laser beam 206 is introduced to interfere with the light from the diffuser and produce interference fringes on a hologram recording area 209 of the recording plane 207. Slit 208 confines the hologram recording to a narrow stripe. The width of the slit determines the image resolution of the hologram plane. After one hologram stripe has been recorded, the recording plane is moved to the next position and a new set of images is projected on the diffuser for the next recording. This process is repeated until the recording surface 207 as shown in FIG. 2($b$) is filled with a holographic stereogram. This is a simple process to record a pair of stereo images in the same hologram. When this hologram is illuminated by light, the eyes positioned at location near the diffuser will see a stereo image of the recorded object as shown in FIG. 1. The diffuser 203 in FIG. 1 can also replaced by a cylindrical lens, which focuses the laser beam into a line with a width matching the width of slit 208 as shown in FIG. 3($a$).

FIG. 3 further extends the concept illustrated in FIG. 2. Instead of recording just a stereo pair, the film 302 contains many views of the object illuminated similarly by a converging cone of laser light. All these views on film are combined into the same hologram unit 309. Pixels 303, 304 are two of these images corresponding to certain views of the object. FIG. 3($b$) shows the process of constructing such views. Layers 311, 312 represent two-dimensional images of certain views of the object. View images are stacked together to form a cube 310. On the front side of this cube, stripes 313, 314 are image units in certain locations in a view such as 311 or any other view. To properly record the hologram unit j which corresponds to image location x=j, the view recorded on film is g(z=nδ, y, x=j) where j indicates location on the x-y plane and n indicates the view frame and δ is the width of stripes such as 310 or 312. Mathematically, the light distribution on the focal plane of the cylindrical lens can be written as:

$$G(u - j\Delta, y) = \sum_{n=-M/2}^{M/2} g(n, y, j) e^{\frac{j2\pi n \delta u}{\lambda F}} \quad (1)$$

where G(u−jΔ, y) is the light distribution on the recording plane. As can be seen, the image segment g(z=nδ, y, x=j) is incident on the hologram with an angle given by sin θ$_n$=nδ/

λF. When such hologram is recorded, the eye will see a gradual change of the views of the object as the eyes scan through the stereogram. See Mark Holzbach, "Three dimensional image processing for synthetic holographic stereograms", M.S. thesis. Massachusetts Institute of Technology, September 1986, pp. 1 86. From a practical point of view, the width of a hologram unit Δ determines the resolution of the stereo image reproduced by this holographic stereogram. It is the objective of this present invention to describe a technique whereby each hologram unit contains more than one image pixel.

BRIEF SUMMARY OF THE INVENTION

The present invention provides an improvement to the above described techniques for producing a holographic stereogram. The present invention uses computer generated holograms in the process of creating the holographic stereogram, and also uses Fourier transforms of the images for display on the LCD display panel, not the images themselves. A lens between the generated images and the recording medium performs the inverse Fourier transform to convert the image back into a normal image.

The use of a computer-generated Fourier transform hologram allows more than one pixel to be encoded and recorded at a time. This allows image resolution to be independent from the slit width in recording the hologram unit. Moreover, the encoding of the image pixels by a Fourier transformation allows the incorporation of random phase in the image pixels. Such a random phase encoding gives the effect of uniform illumination, eliminating the need for the diffuser of the prior art. This significantly simplifies the illumination of the film transparency or LCD display panel.

BRIEF DESCRIPTION OF THE DRAWINGS

FIG. 1 is a diagram of a user viewing a holographic stereogram.

FIGS. 2(a) and 2(b) are diagrams of a prior art method of constructing a holographic stereogram.

FIGS. 3(a) and 3(b) are diagrams of a prior art method of constructing a holographic stereogram with more than two views.

FIG. 4 is a diagram showing the principle of recording holographic stereogram using the present invention.

FIGS. 5(a) and 5(b) are top and side views of an optical system for constructing a holographic stereogram implementing the principle of FIG. 4 according to the present invention.

DETAILED DESCRIPTION OF THE INVENTION

FIG. 4 illustrates the principle of the present invention. A laser light beam 401 illuminates a transparency or a display panel 402. This could be done by illumination from the back for a transparency, or illumination from the front using a beam splitter (see, e.g., U.S. Pat. No. 6,043,913). Instead of displaying the view pixels on the transparency or LCD screen as shown in FIG. 3, the Fourier transform of a group of image pixels are displayed. The function g(n,y,i) represents the nth view of an object at location x=i. The Fourier transform of a segment of g(n,y,i) is defined as:

$$G_n(k, y) = \sum_{k=1}^{m} g(n, y, i) e^{j2\pi i k} \quad (2)$$

where k=1, ... m, n=1, ... N and i=0, ... ,N/m. The view displayed on film or the display panel is equal to $$G(k + mi, y) = \sum_{n} G_n(k + mi, y). \quad (3)$$

Segments 404 and 403 in FIG. 4 are representatives of the function $G_n(k,y)$. Since $G_n(k,y)$ is a complex function which can not be displayed on film or a display panel, instead an equivalent function below is used:

$$H_n(k,y) = A + Re\{G_n(k,y)\} \quad (4)$$

where A is a constant and Re{ } means the real part of the function within the bracket. The function $H_n$ (k, y) is called the Fourier transform hologram of the function g(n, y, j).

Lens 405 provides an inverse Fourier transform to convert segment 404 into image pixels 409,410,411,412. The number of image pixels at the recording plane is determined by the construction of the Fourier segment 404. Four image pixels are illustrated, although other numbers could be used. A mask with a slit 408 confines the hologram unit to just recording the image pixels reconstructed from the Fourier segment. Similar Fourier segments which correspond to the different views are then displayed on 402 to record the hologram unit in the next position until the complete holographic stereogram is recorded. A major distinction between the present invention and the prior art is that more than one image pixel may be recorded inside a hologram unit. In a computer, the Fourier transform $G_n(k,y)$ can incorporate a random phase into the image as shown by the following equation:

$$G_n(k, y) = \sum_{k=1}^{m} g(n, y, i) e^{j\phi(n,y,i)} e^{j2\pi i k}. \quad (5)$$

The addition of a random phase to each pixel renders the pixels incoherent from each other so that there will be no interference fringes produced in the reconstructed stereo image. In the prior art system a rotating diffuser is used in front of the film or display panel. The present invention removes this added complexity from the recording system.

FIGS. 5(a) and 5(b) are top and side views of an optical system which implements the concept of the present invention described in FIG. 4. A collimated laser beam illuminates a liquid crystal display (LCD) panel 502 which takes the place of the film transparency in FIG. 2. Too avoid confusing the illustration of the invention, the optics for producing the collimated laser beam and directing it through or at a transparency or LCD panel are not shown. FIG. 5(a) shows the top view of this anamorphic optical system. Segment 503 is the Fourier transform hologram Hn(k,y). The beam, after passing through LCD panel 502, is focused by a spherical lens 504. Lens 504 performs an inverse Fourier transform function to produce a diffracted, reconstructed image. The reconstructed image from Hn(k,y) is diffracted off the optical axis due to the properties of Hn(k,y). A slit 505 is used to pass only one of the diffracted orders from the function Hn(k,y). The beam from lens 504 is collimated by a spherical lens 506 and focused again by cylindrical lens 507 to the recording plane 508. Lenses 506 and 507 form a telecentric optical system which basically images the reconstructed image on plane 505 to the recording plane 508. Since Hn(k,y) is the Fourier transform hologram of g(n,y,j), the inverse Fourier transform of Hn(k,y) performed by lens 504, and imaged by lenses 506 and 507, reproduces the function g(n,y,j) on the recording plane 508. A slit 509 is used to restrict the recording width of hologram unit 510. The hologram on plane 508 is recorded with the aid of a reference beam 511.

The orthogonal, side view of the optical system in FIG. 5(b) shows the focused beam at plane 505 is collimated by a spherical lens 506. In this orientation, the LCD panel is imaged to the recording plane 508. The image on recording plane 508 is a magnified version of the image on LCD panel 502. The magnification is given by the ratio of the focal lengths of lens 506 and lens 504. The light beam from the LCD panel is combined with a reference beam 511 to form the hologram unit 510. A unique property of this recording system is that each hologram unit at u=jΔ corresponds to a group of image pixels as given in Equation (2). The resolution of the image is independent of the width of a hologram.

As will be understood by those of skill in the art, the present invention could be embodied in other specific forms without departing from the essential characteristics thereof. For example, a different lens could be used to perform the inverse Fourier transformation. Accordingly, the foregoing description is illustrative, but not limiting, of the scope of the invention which is set forth in the following claims.

What is claimed is:

1. A system for recording a holographic stereogram on a recording medium comprising:
   a source image display having a plurality of pixels represented by a Fourier transform hologram;
   a laser source for illuminating said source image display;
   a lens system for focusing an image on said recording medium, said lens system including a inverse Fourier transformation lens, causing said holographic stereogram to appear on said recording medium.

2. The system of claim 1 wherein said source image display is an LCD panel.

3. The system of claim 1, further comprising a first mask with a slit positioned between said source image display and said recording medium to limit the diffracted orders allowed to propagate to said recording medium.

4. The system of claim 1 further comprising a mask with a slit positioned between said lens system and said recording medium to restrict the recording width on said recording medium.

5. The system of claim 1 wherein the image pixels on said source image display are multiplied by a random phase before the computation of said Fourier transform.

6. The system of claim 1 wherein said lens system includes a telecentric lens system with a spherical lens and a cylindrical lens.

7. A system for recording a holographic stereogram on a recording medium comprising:
   a source image LCD display panel having a plurality of pixels represented by a Fourier transform hologram, wherein the image pixels on said source image display panel are multiplied by a random phase before the computation of said Fourier transform;
   a laser source for illuminating said source image display;
   a first mask with a slit positioned between said source image LCD display panel and said recording medium to limit the diffracted orders allowed to propagate to said recording medium;
   a lens system, for focusing an image on said recording medium, causing said holographic stereogram to appear on said recording medium, said lens system including an inverse Fourier transformation lens for performing inverse Fourier transformation is mounted between said source image display and said recording medium;
   a second mask with a slit positioned between said lens system and said recording medium to restrict the recording width on said recording medium.

8. A method for recording a holographic stereogram on a recording medium comprising:
   providing a source image having a plurality of pixels represented by a Fourier transform;
   illuminating said source image with a laser source;
   diffracting said source image with a hologram;
   performing an inverse Fourier transformation on said source image; and
   focusing an image on said recording medium, causing said holographic stereogram to appear on said recording medium.

9. The method of claim 8 further comprising:
   limiting the diffracted orders allowed to propagate from said hologram using a mask with a slit.

10. The method of claim 8 further comprising:
    restricting the recording width on said recording medium using a mask with a slit.

11. The method of claim 8 further comprising:
    multiplying the pixels of said source image by a random phase before the computation of said Fourier transform.

* * * * *